US006944036B2

(12) United States Patent
Yan et al.

(10) Patent No.: US 6,944,036 B2
(45) Date of Patent: Sep. 13, 2005

(54) DC/DC CONVERTER WITH VOLTAGE CLAMP CIRCUIT

(75) Inventors: Chao Yan, Taoyuan (TW); Hongyang Wu, Taoyuan (TW); Heoyi Ye, Taoyuan (TW); Jianping Ying, Taoyuan (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 79 days.

(21) Appl. No.: 10/749,919

(22) Filed: Dec. 31, 2003

(65) Prior Publication Data

US 2004/0233689 A1 Nov. 25, 2004

(30) Foreign Application Priority Data

May 22, 2003 (TW) ....................................... 92113910 A

(51) Int. Cl.[7] ...................... H02H 7/122; H02M 7/5387

(52) U.S. Cl. ...................... 363/56.02; 363/132; 363/98; 323/363

(58) Field of Search ................................ 363/17, 56.02, 363/56.03, 56.04, 56.05, 56.12, 98, 132, 58; 323/252, 333, 363

(56) References Cited

U.S. PATENT DOCUMENTS

| | | | | | |
|---|---|---|---|---|---|
| 5,198,969 | A | * | 3/1993 | Redl et al. | 363/17 |
| 5,953,222 | A | * | 9/1999 | Mizutani | 363/56.05 |
| 6,115,271 | A | * | 9/2000 | Mo | 363/56.12 |
| 6,876,556 | B2 | * | 4/2005 | Zhu et al. | 363/17 |

* cited by examiner

*Primary Examiner*—Jessica Han
(74) *Attorney, Agent, or Firm*—Perkins Coie LLP

(57) ABSTRACT

In those conventional arts, a DC/DC converter with secondary clamp circuit has a problem of voltage oscillation, and a DC/DC converter with primary clamp circuit has problems of heat and clamping losses due to larger forward and reverse currents passing the primary clamp circuit. The present invention applies a tapped inductor or a set of coupling inductors to a DC/DC converter with primary clamp circuit for reducing the voltage oscillation, and furthermore to decrease the forward and reverse current passing through the clamp circuit for reducing the clamping losses of the clamp circuit.

20 Claims, 7 Drawing Sheets

DC/DC CONVERTER WITH VOLTAGE CLAMP CIRCUIT

CROSS REFERENCE TO RELATED APPLICATIONS

This application claims priority to Taiwan Patent Application No. 092113910, filed May 22, 2003, which is hereby incorporated by reference in its entirety.

TECHNICAL FIELD

This invention relates to a soft-switching DC/DC converter, and more particularly to a DC/DC converter with a voltage clamp circuit.

BACKGROUND

A standard switching power supply employs PWM (pulse width modulation) to transfer an input power to a loading for supplying a suitable power. Switches (in general, being power MOSFETs) controlled by the PWM convert a DC input to a series of voltage pulses, and then a transformer and a fast diode are employed to output a smooth DC output. The voltage of the DC output is immediately compared with a reference voltage (the reference voltage is a predetermined output voltage for the power supply) and the difference between the voltages is feedback to a controller of the PWM for changing the pulse width according to the voltage difference. For example: when the output voltage is too high, the pulse width will be reduced to lower the supply of the power supply for returning the output voltage to the predetermined voltage. Hence, changing the pulse width to control a turning-on time of power switch can modulate a precise DC output voltage for demand.

An insufficient switching is a main reason of a power loss of a converter. When a switch is under state of turning-on and turning-off, a power consumption is occurred if a voltage and a current passing the switch are not zero. When the switching frequency of the switch increases, the average power consumption will increase because of too many transferences. A higher switching frequency can reduce the dimensions of filters and transformers and then the converter will become smaller and lighter. In a resonant converter, switching actions thereof are occurred when a voltage and/or a current is zero for avoiding the voltage and the current simultaneously being under the transferring state and so the switching losses can be avoided.

A controlling method of soft switching pulse width modulation combines the advantages of the resonant converter and the pulse width modulation. Therefore, the soft switching of a power switch and a high efficient working of high frequency can be achieved simultaneously. Furthermore, a dimension of a passive device can be reduced and a power density can be raised. This is one topic of recent development in Electrical and Electronic Systems Engineering. Researches on a soft switching of a phase shifted full bridge converter are popular in the filed of DC/DC converter, and it's a ideal topology for a high frequency DC power supply, especially on applications of medium and large power.

FIG. 1 illustrates a typical phase shifted full bridge converter. L1 is the resonant inductance outside of the transformer. An output parasitic capacitor of the MOSFETs Q3 and Q4 of the lagging bridge leg is charged with energy saved in resonant inductance L1 for reaching the ZVS (zero voltage switch) of the MOSFET. Meanwhile, due to resonant inductance L1, a reflected loading current and a reflected reverse recovery current in the primary side of the transformer pass through resonant inductance L1 and limit a rate of changing current di/dt of output diodes D3 and D4 when current transition. Hence, the reverse recovery current of the diode and the EMI (electromagnetic interference) on the circuit can be reduced.

Nevertheless, some negative influences are made by the resonant inductance outside the transformer. Generally, the quantities of the resonant inductance L1 outside the transformer are higher than the leakage inductance of an isolated transformer T for enlarging the range of the soft switching. Therefore, in FIG. 1, if the clamp circuit RCD (the resistance Rc, the capacitor Cc and the diode D1 are in the region surrounded by the dash line) does not installed on the secondary side of the transformer T, the reverse recovery current in response to a reverse recovery current of the output diode D3 or D4 flows through the resonant inductance L1. Therefore, the resonant inductance L1 stores most of energy of the reverse recovery current. Because the diode with the reverse recovery current is cut off suddenly while the reverse current reaches its maximum, an oscillation is occurred between the resonant inductance L1 and the parasitic capacitor of this diode. The voltage oscillation at point C shown in FIG. 1 is happened. FIG. 2 shows the measured voltage oscillation. Due to the voltage oscillation at point C being reflected to the secondary side of the isolated transformer, the voltage oscillation is also occurred on the diode D3 or D4 under reverse recovery as shown in FIG. 3.

A loss clamp circuit is often used to reduce the voltage oscillation. A typical loss clamp circuit RCD is presented in the region surrounded by the dash line in FIG. 1. The voltage oscillation between the resonant inductance L1 and the parasitic capacitor of diode D3 or D4 can be reduced by installing the clamp circuit RCD in the secondary side of the transformer T shown in FIG. 1. The voltage waveform of diode D3 or D4 in the secondary side with the clamp circuit RCD is shown in FIG. 4. Compared with FIG. 3, peak voltage of the diode D3 or D4 is lowered, but some parasitic oscillations still exist. Hence, the effect of the voltage clamp circuit using loss clamp circuit is not perfect.

In U.S. Pat. No. 5,198,969, the phase shifted full bridge converter with a primary side clamp circuit is provided by Redl et al. in 1992, as shown in FIG. 5. Though the mentioned voltage oscillation can be reduced by the primary side clamp circuit, some heating problems of the clamp circuit diode D1 and D2 are found because of the higher forward current flowed through clamp diode D1 and D2. Thus, problems of heat diffusing on clamp diode D1 and D2 need to be solved. Moreover, high power loss exists due to the high reverse recovery current.

SUMMARY

One of objectives of the present invention is to provide an ideal clamp circuit so that a peak voltage of an output diode is lowered.

Another objective of present invention is to reduce the forward and reverse recovery current passed through the clamp circuit for reducing losses of the clamp circuit.

As aforementioned, the present invention provides a method for clamping voltage in a DC/DC converter. The method comprises: transforming an input voltage into an output voltage by the DC/DC converter; connecting a clamp circuit to the DC/DC converter to clamp the output voltage; and connecting a set of inductances to the DC/DC converter and the clamp circuit. The set of inductances comprises a first inductance and a second inductance that connect in series and is coupled with each other, a terminal of the first inductance connected to the DC/DC converter, a terminal of the second inductance coupled to the clamp circuit, and a connect point at which the first inductance and the second inductance are connected connecting to a primary winding of a transformer of the DC/DC converter. Therefore, when a current in a rectifier of the DC/DC converter is changing a direction of the current, a reverse recovery current of a rectifier diode of the rectifier reflects to a primary side of the transformer and forms an induced current flowing through the first inductance and the primary winding, when the reverse recovery current of the diode is cut off, the induced current decreases and passes through the set of inductances and the clamp circuit. Hence, a peak voltage of an output diode is lowered and the positive and the reverse recovery current passed through the clamp circuit can be reduced for reducing losses of the clamp circuit.

Moreover, the present invention also provides a DC/DC converter having a clamp circuit. The converter comprises a first series switch circuit, a second series switch circuit, a clamp circuit, a set of inductances, a transformer, and an output rectifier circuit. The present invention also provides a tri-level DC/DC converter having a clamp circuit. The converter comprises a series capacitor, a switch circuit, a capacitor means, a series diode, a clamp circuit, a set of inductances, a transformer, and an output rectifier circuit. When a current in the rectifier is changing the direction of the current, a reverse recovery current of a rectifier diode of the rectifier reflects to a primary side of the transformer and forms an induced current flowing through the first inductance and the primary winding, when the reverse recovery current of the diode is cut off, the induced current decreases and passes through the set of inductances and the clamp circuit. Hence, a peak voltage of an output diode is lowered and the positive and the reverse recovery current passed through the clamp circuit can be reduced for reducing losses of the clamp circuit.

Hence, a serious voltage oscillation is occurred in the secondary side clamp circuit and a heat diffusing and a leakage problem of a primary side clamp circuit due to a high forward and reverse recovery current. The present invention can reduce the voltage oscillation of the diode, the forward current, and the reverse recovery current flowed through the primary side clamp circuit. Moreover, the present invention can reduce losses of the clamp circuit.

BRIEF DESCRIPTION OF THE DRAWINGS

The foregoing aspects and many of the attendant advantages of this invention will become more readily appreciated as the same becomes better understand by reference to the following detailed description, when taken in conjunction with the accompanying drawings, where in.

DETAILED DESCRIPTION

Some sample embodiments of the invention will now be described in greater detail. Nevertheless, it should be recognized that present invention can be practiced in a wide range of other embodiments besides those explicitly described, and the scope of the present invention is expressly not limited expect as specified in the accompanying claims.

Then, the components of the different elements are not shown to scale. Some dimensions of the related components are exaggerated and meaningless portions are not drawn to provide a more clear description and comprehension of the present invention.

Figure 6:
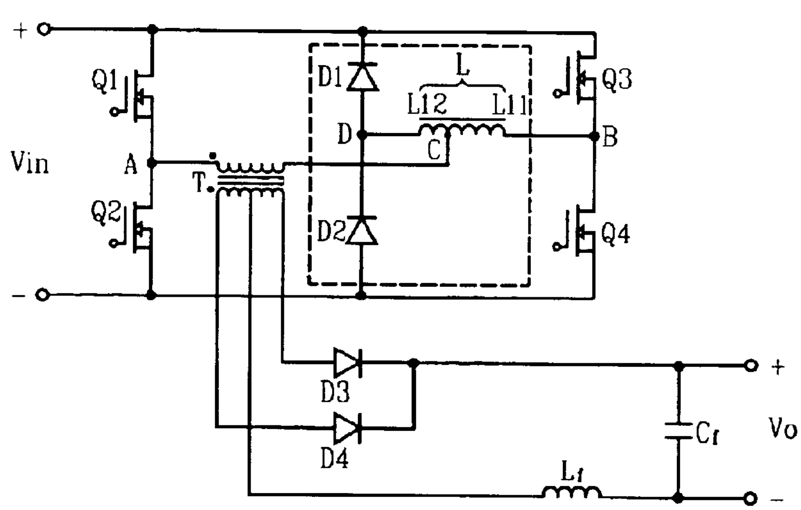
FIG. 6 is a schematic diagram of a phase shifted full bridge converter with a clamp circuit in primary side of the present invention.

FIG. 6 shows one preferred embodiment of the present invention that is applied to a phase shifted full bridge converter. The circuit in the region surrounded by the dash line is the main element of the present invention. The circuit comprises a tapped inductance L and two clamp diodes D1 and D2. The operating principle of this circuit will be described in a great detail as follows.

In FIG. 6, the input of the phase shifted full bridge converter is a DC voltage, and in practical application, it is usually an output of a PFC (Power Factor Correction). There are four switching transistors (usually MOSFET) Q1, Q2, Q3 and Q4 in the primary side of the phase shifted full bridge converter, and switching transistor Q1 and Q2 alternately turn on and off. The switching transistor Q4 also alternately turns on and off following the switching transistor Q1, and the transistor Q3 follows the transistor Q2 as well. In the secondary side of the phase shifted full bridge converter, the output voltage Vo can be rectified by two rectifying diodes D3 and D4, while the voltage noises can be filtered by the inductance Lf and the capacitor Cf of the filter circuit LC.

The tapped inductance L comprising of the inductance L11 and the inductance L12 is an important element in the present invention. Turns of the two inductances L11 and L12 are n11 and n12 respectively. In practical applications, the inductances L11 and L12 of the tapped inductance L should be coupled very well. When a current in the rectifier is not changing a direction of said current, the entire primary current of the transformer flows through the inductance L11. Thus, windings of the inductance L11 must be strong to afford all of the primary current. On the other hand, the inductance L12 is only flowed by a current that the reverse recovery current reflects to the primary side, when a current in the rectifier is changing a direction of said current. Hence, the windings of the inductance L12 can be thinner than the windings of the inductance L11.

FIG. 6 illustrates that when a reverse recovery is occurred in the rectifying diode D4, the transistors Q2 and Q3 conduct and a current flowing through the rectifying diode D3 is composed of a loading current and the reverse recovery current of the rectifying diode D4. A primary current reflected from the current flowing through the rectifying diode D3 in primary side through the transformer flows the inductance L11. Hence, the primary current also comprises two parts that one part is reflected from the loading current and the other part is reflected from the reverse recovery current of the rectifying diode D4. Then, after the current flowing through rectifying diode D4 suddenly cuts off and the reflected reverse recovery current flowing through the inductance L11 changes to flow the inductance L12, the transistor Q3 and the clamp diode D1 successively form a circulation current. When a current flowing through the clamp diode D1 is $i_{rr} \cdot n_{11}/N \cdot (n_{11}+n_{12})$, wherein $i_{rr}$ is the reverse recovery current of D4 and N is a turns ratio of the transformer. Due to the transistor Q3 and the clamp diode D1 conducting, the voltages at the point B and the point D are Vin. The voltage difference between two terminal points of the tapped inductance is clamped at zero. If the inductance L11 and the inductance L12 are coupled well, a voltage of the point C is near Vin, even is clamped at Vin as well. Simultaneously, the transistor Q2 also conducts and so a voltage of the point A is zero. Therefore, the voltage difference of the voltage at the point A minus the voltage at the point C is clamped at −Vin, and so the voltage across the secondary windings is clamped at −Vin/N.

The similar process is also occurred when a reverse recovery is occurred in the rectifying diode D3. At this time, the transistors Q1 and Q4 conduct and a current flowing through the rectifying diode D4 is composed of a loading current and the reverse recovery current of the rectifying diode D3. A primary current reflected from the current flowing through the rectifying diode D4 in primary side through the transformer flows the inductance L11. The primary current also equally comprises two parts that one part is reflected from the loading current and the other part is reflected from the reverse recovery current of the rectifying diode D3. Then, after the current flowing through rectifying diode D3 suddenly cuts off and the reflected reverse recovery current flowing through the inductance L11 changes to flow the inductance L12, the transistor Q4 and the clamp diode D2 successively form a circulation current. The current flowing through the clamp diode D2 is $i_{rr} \cdot n_{11}/N \cdot (n_{11}+n_{12})$, wherein $i_{rr}$ is the reverse recovery current of D3. Due to the transistor Q4 and the clamp diode D2 conducting, the voltages at the point B and the point D are zero. The voltage difference between two terminal points of the tapped inductance is clamped at zero. If the inductance L11 and the inductance L12 are coupled well, a voltage of the point C is clamped at zero. Simultaneously, the transistor Q1 also conducts and so a voltage of the point A is Vin. Therefore, the voltage difference of the voltage at the point A minus the voltage at the point C is clamped at Vin and so the voltage across the secondary windings is clamped at Vin/N.

Figure 5:
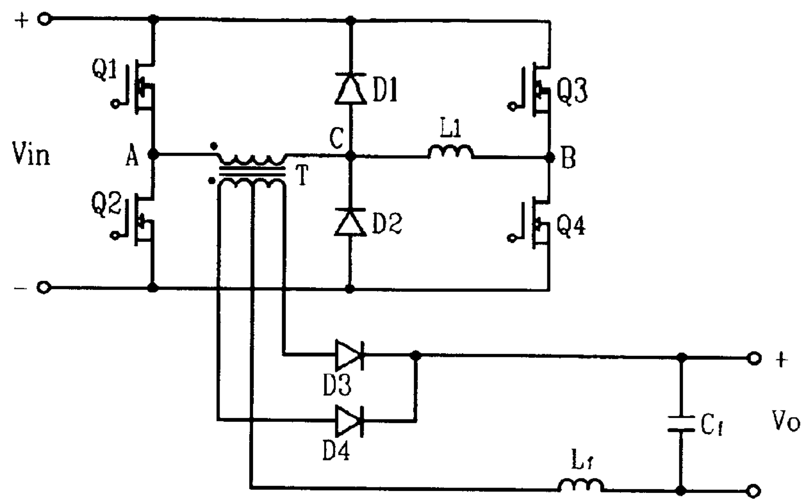
FIG. 5 is a schematic diagram of a phase shifted full bridge with a clamp circuit in primary side in the conventional arts.

Obviously, by the clamp circuit of the present invention, currents flowing through the inductance L12, and the clamp diodes D1 and D2 are $n_{11}/(n_{11}+n_{12})$ times of the currents flowing the clamp circuit shown in FIG. 5. Hence, the positive and reverse recovery current passed through the clamp circuit of the present invention are reduced and so losses of the clamp circuit can be reduced. For reducing the losses of the duty cycle, the following equation must be satisfied:

$$0 \le \frac{n_{12}}{n_{11}} \le \frac{L_k}{L_{11}} \tag{1}$$

Wherein, $L_k$ is the leakage inductance of the transformer T, $L_{11}$ is the inductance of the inductance L11, $n_{12}$ and $n_{12}$ are turns of the inductance L11 and the inductance L12 respectively.

Figure 7:
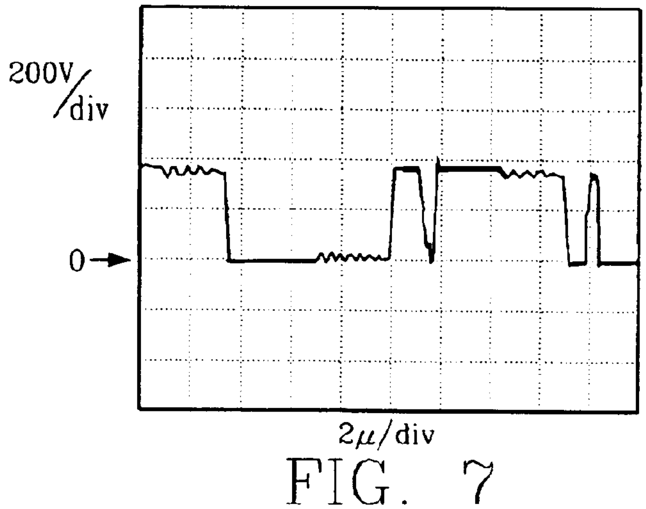
FIG. 7 is a voltage waveform measured at point C in FIG. 6.
Figure 8:
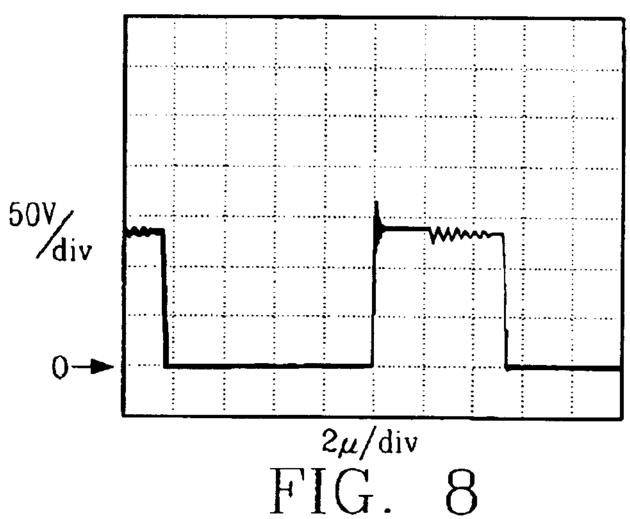
FIG. 8 is a measured voltage waveform of the rectifying diode in FIG. 6.

According to the aforementioned analysis, the voltage of the point C is clamped between 0 and Vin. That can be verified with the voltage oscillation at the point C shown in FIG. 7. The voltage at the other terminal point A of the primary winding of the transformer T is also between 0 and Vin. Therefore, the voltage of the primary windings is clamped between −Vin and Vin and the voltage of the secondary windings is clamped between −Vin/N and Vin/N. Hence, the voltage of the rectifying diodes D3 and D4 are correspondingly clamped. FIG. 8 shows the voltage waveform of the rectifying diode by employing the clamp circuit of the present invention. However, a voltage overshot is occurred in the diodes D3 and D4 due to a light leakage inductance in the transformer T.

Figure 1:
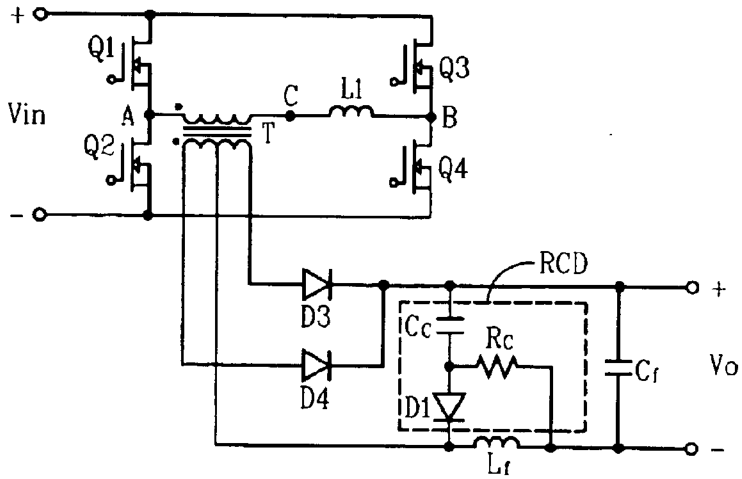
FIG. 1 is a schematic diagram of a phase shifted full bridge converter with a clamp circuit in secondary side in the conventional arts.
Figure 2:
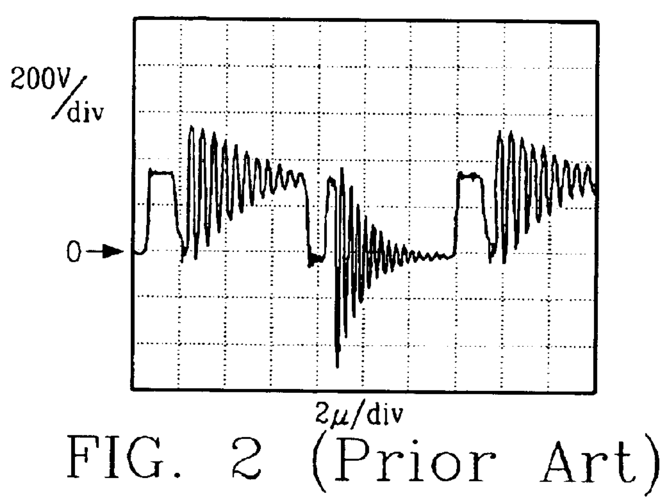
FIG. 2 is a voltage waveform measured at point C without RCD circuit in FIG. 1.
Figure 3:
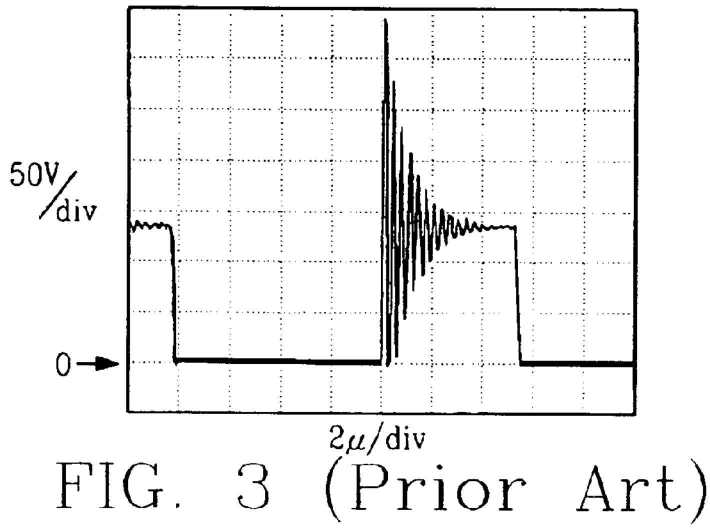
FIG. 3 is a measured voltage waveform of the rectifying diode without RCD circuit in FIG. 1.
Figure 4:
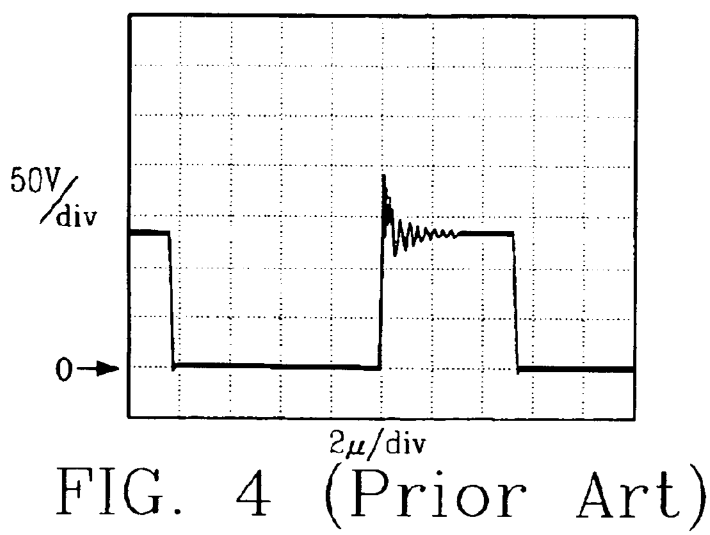
FIG. 4 is a measured voltage waveform of the rectifying diode with RCD circuit in FIG. 1.
Figure 12:
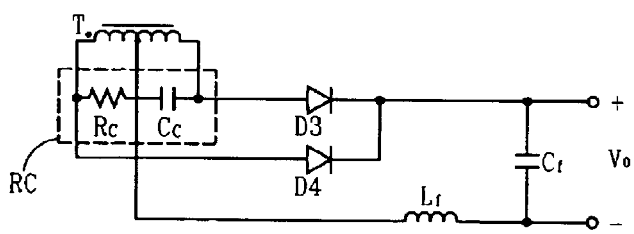
FIG. 12 is a schematic diagram of the loss clamp circuit RC in secondary side.
Figure 13:
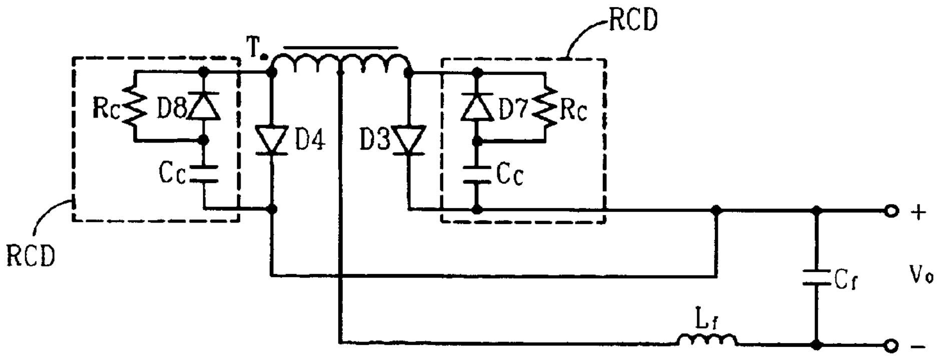
FIG. 13 is a schematic diagram of the loss clamp circuit RCD in secondary side.
Figure 14:
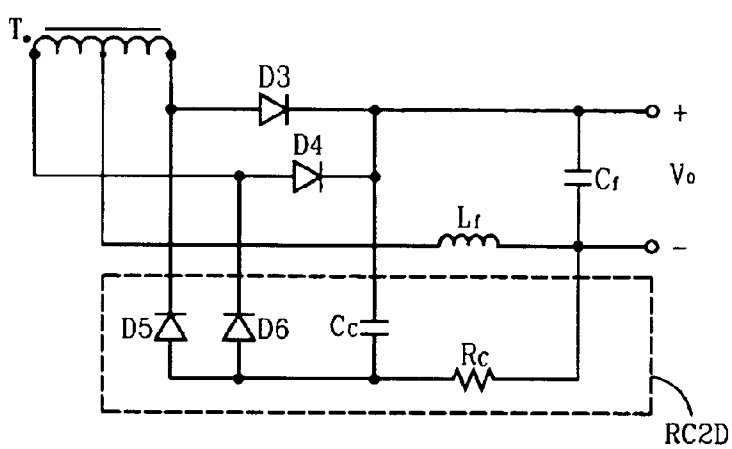
FIG. 14 is a schematic diagram of the loss clamp circuit RC2D in secondary side.

The voltage overshot occurred in the diodes D3 and D4 can be restrained by a loss clamp circuit in secondary side, e.g.: the loss clamp circuit RCD shown in FIG. 1, the loss clamp circuit RC shown in FIG. 12, loss clamp circuit RCD shown in FIG. 13 and loss clamp circuit RC2D shown in FIG. 14 (for more clear description, in FIG. 12, FIG. 13, and FIG. 14, there are only show the secondary side). Hence, the present invention also discloses a circuit comprising a tapped clamp inductance in primary side and a loss clamp circuit in the secondary side.

Figure 9:
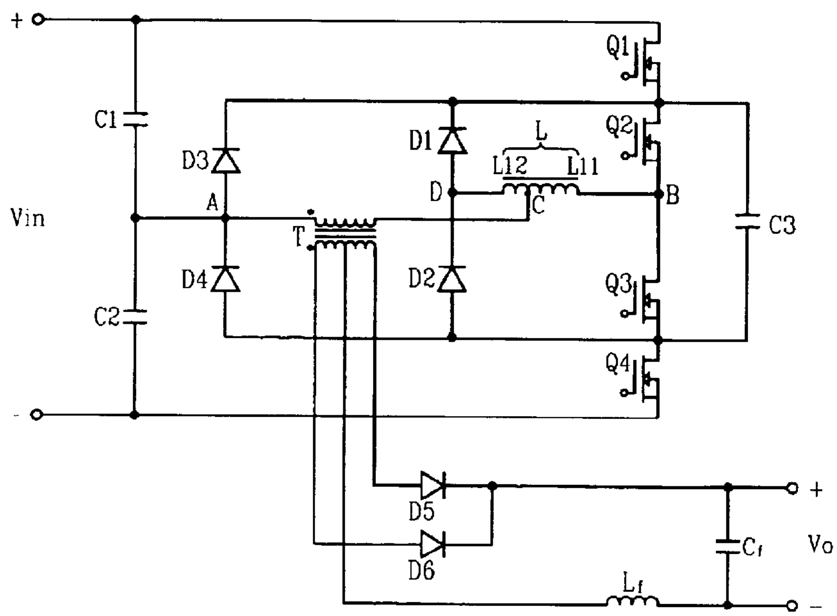
FIG. 9 is a schematic diagram of another embodiment of the present invention applied to tri-level converter with a clamp circuit in primary side.

FIG. 9 shows another preferred embodiment applied to tri-level DC/DC converter. Voltages across the capacitors C1 and C2 are 0.5 Vin, and so the voltage at point A is also 0.5 Vin. A voltage across the capacitor C3 is also 0.5 Vin. Therefore, a voltage at point C is clamped between 0 and Vin by the clamp diode, e.g.: when the positive rail of the Vin is +400V and the negative rail thereof is −400V, the voltage at point A is 0V, the voltage of point C is between −400V and +400V. Hence, the voltage of the primary windings of the transformer T is clamped between 0 and Vin and the voltage of the secondary windings of the transformer T is clamped between 0 and Vin/N. The loss clamp circuit in secondary side also can be applied to reduce the voltage overshot of the rectifying diodes D5 and D6.

Figure 10:
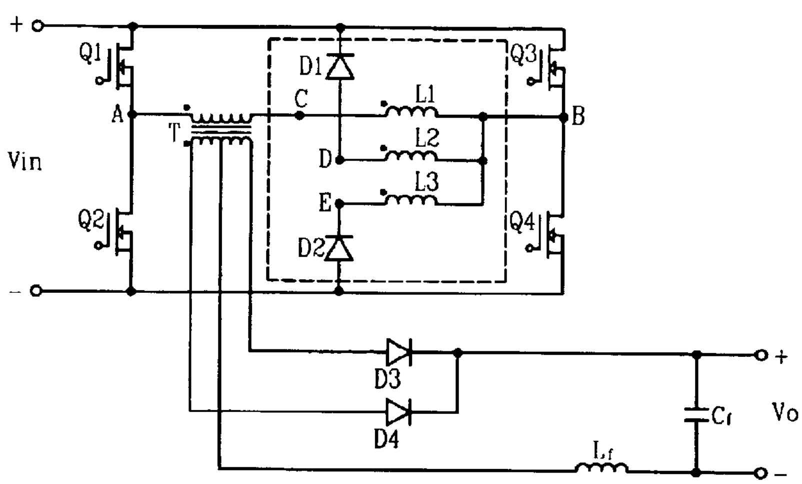
FIG. 10 is a schematic diagram of another embodiment employing coupled inductances of the present invention.
Figure 11:
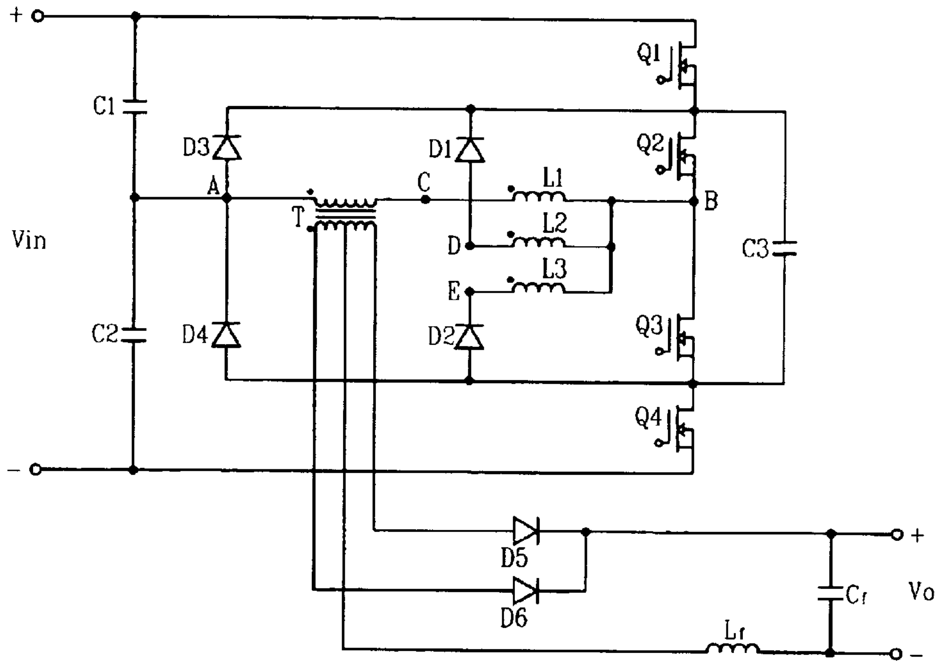
FIG. 11 is a schematic diagram of another embodiment of the present invention applied to tri-level converter with coupled inductances.

The circuits shown in FIG. 10 and FIG. 11 are modified according to the circuit shown in FIG. 6 and FIG. 9 and are applied to phase shifted full bridge converter and tri-level DC/DC converter. In FIG. 10 and FIG. 11, the tapped inductance L is replaced with the coupled inductances L1, L2, and L3. If the turns of inductances L1, L2, and L3 are $n_1$, $n_2$, and $n_3$ respectively. Eq. (1) can be rewritten as below:

$$0 \le \frac{n_2 - n_1}{n_1} \le \frac{L_k}{L_1} \tag{2}$$

$$0 \le \frac{n_3 - n_1}{n_1} \le \frac{L_k}{L_1} \tag{3}$$

Wherein, $L_k$ is the leakage inductance of the transformer T and $L_1$ is the inductance of the inductance L1.

The turns $n_2$ and $n_3$ of the inductances L2 and L3 are not limited equal, preferable $n_2$ being equal to $n_3$. A current flowing through the inductances L2 and L3 is only a current reflected from the reverse recovery current of the rectifying diodes D5 and D6 and so the windings of the inductances L2 and L3 may be thinner that the windings of the inductance L1. A loss clamp circuit in secondary side also can be applied to reduce the voltage overshot of the rectifying diodes D5 and D6.

Moreover, the circuit comprising a tapped inductance (or coupled inductances) also can be applied to a DC/DC converter having a clamp circuit in primary side for reducing the loss of the clamp circuit.

As aforementioned, the present invention provides a method for clamping voltage in a DC/DC converter. The method comprises: transforming an input voltage into an output voltage by the DC/DC converter; connecting a clamp circuit to the DC/DC converter to clamp the output voltage; and connecting a set of inductances to the DC/DC converter and the clamp circuit. Wherein the set of inductances comprises a first inductance and a second inductance that connect in series and is coupled with each other, a terminal of the first inductance connected to the DC/DC converter, a terminal of the second inductance coupled to the clamp circuit, and a connect point at which the first inductance and the second inductance are connected connecting to a primary winding of a transformer of the DC/DC converter. Therefore, when a current in a rectifier of the DC/DC converter is changing a direction of the current, a reverse recovery current of a rectifier diode of the rectifier reflects to a primary side of the transformer and forms an induced current flowing through the first inductance and the primary winding, when the reverse recovery current of the diode is cut off, the induced current decreases and passes through the set of inductances and the clamp circuit. Hence, a peak voltage of an output diode is lowered and the positive and the reverse recovery current passed through the clamp circuit can be reduced for reducing losses of the clamp circuit.

Moreover, the present invention also provides a DC/DC converter having a clamp circuit. The converter comprises a first series switch circuit, a second series switch circuit, a clamp circuit, a set of inductances, a transformer, and an output rectifier circuit. The present invention also provides a tri-level DC/DC converter having a clamp circuit. The converter comprises a series capacitor, a switch circuit, a capacitor means, a series diode, a clamp circuit, a set of inductances, a transformer, and an output rectifier circuit. When a current in the rectifier is changing a direction of the current, a reverse recovery current of a rectifier diode of the rectifier reflects to a primary side of the transformer and forms an induced current flowing through the first inductance and the primary winding, when the reverse recovery current of the diode is cut off, the induced current decreases and passes through the set of inductances and the clamp circuit. Hence, a peak voltage of an output diode is lowered and the positive and the reverse recovery current passed through the clamp circuit can be reduced for reducing losses of the clamp circuit.

Hence, the present invention can reduce the voltage oscillation of the diode, the forward current, and the reverse recovery current flowed through the primary side clamp circuit. Moreover, the present invention can reduce losses of the clamp circuit.

Although specific embodiments have been illustrated and described, it will be obvious to those skilled in the art that various modifications may be made without departing from what is intended to be limited solely by the appended claims.

We claim:

1. A phase shifted full bridge converter having a clamp circuit, said converter comprising:

a first series switch circuit comprising a first switch and a second switch, said first switch and said second switch connected with a DC input source in series;

a second series switch circuit comprising a third switch and a fourth switch, said third switch and said fourth switch connected with said DC input source in series;

a clamp circuit comprising a first clamp diode and a second clamp diode, said first clamp diode and said clamp diode connected to said DC input source in series;

a set of inductances comprising a first inductance and a second inductance that connect in series and are coupled with each other, a terminal of said first inductance connected to a connection point at which said third switch and said fourth switch are connected in series and a terminal of said second inductance coupled to said clamp circuit;

a transformer comprising a primary winding and a secondary winding, said primary winding connected between a first connection point at which said first switch and said second switch are connected in series and a second connection point at which said first inductance and said second inductance are connected in series; and an output rectifier circuit comprising a rectifier, a filtering capacitor, and a filtering inductance, said output rectifier circuit connected to said secondary winding;

wherein when a current in said rectifier is changing a direction of said current, a reverse recovery current of a rectifier diode of said rectifier reflects to a primary side of said transformer and forms an induced current flowing through said first inductance and said primary winding, when said reverse recovery current of said rectifier diode is cut off, said induced current decreases and passes through said set of inductances and said clamp circuit.

2. The converter in claim 1, said set of inductances is a tapped inductance.

3. The converter in claim 1, said first inductance is thicker than said second inductance.

4. The converter in claim 1, a ratio of turns of said second inductance and turns of said first inductance is small than or equal to a ratio of a leakage inductance of said transformer and said first inductance.

5. The converter in claim 1, said first switch, said second switch, said third switch and said fourth switch are MOSFETs.

6. The converter in claim 1, said output rectifier circuit further comprises a loss clamp circuit.

7. The converter in claim 6, said loss clamp circuit at least comprises a resistance and a capacitor.

8. The converter in claim 1, said set of inductances further comprises a third inductance, said third inductance connected between a connection point at which said first inductance and said second inductance are connected in series and said clamp circuit.

9. The converter in claim 8, said first inductance is thicker than said third inductance.

10. The converter in claim 8, a ratio of turns of said second inductance minus said first inductance and turns of said first inductance is small than or equal to a ratio of a leakage inductance of said transformer and said first inductance, and a ratio of turns of said third inductance minus said first inductance and turns of said first inductance is small than or equal to a ratio of a leakage inductance of said transformer and said first inductance.

11. A tri-level DC/DC converter having a clamp circuit, said converter comprising:

a series capacitor comprising a first capacitor and a second capacitor, said series capacitor connected to a DC input source;

a circuit comprising a first switch, a second switch, a third switch, and a fourth switch, said first switch, said second switch, said third switch, and said fourth switch being connected in series and connected to said DC input source;

a capacitor means connected between a connection point at which said first switch and said second switch are connected and a connection point at which said third switch and said fourth switch are connected;

a series diode comprising a first diode and a second diode, said series diode connected with said capacitor means in parallel, a connection point at which said first diode and said second diode are connected being connected with a connection point at which said first capacitor and said second capacitor are connected;

a clamp circuit comprising a first clamp diode and a second clamp diode, said clamp circuit connected with said capacitor means in parallel;

a set of inductances comprising a first inductance and a second inductance that connect in series and is coupled with each other, a terminal of said first inductance connected to a connection point at which said second switch and said third switch are connected, and a terminal of said second inductance coupled to said clamp circuit;

a transformer comprising a primary winding and a secondary winding, said primary winding connected between a connection point at which said first diode and said second diode are connected and a connection point at which said first inductance and said second inductance are connected; and an output rectifier circuit comprising a rectifier, a filtering capacitor, and a filtering inductance, said output rectifier circuit connected to said secondary winding;

wherein when a current in said rectifier is changing a direction of said current, a reverse recovery current of a rectifier diode of said rectifier reflects to a primary side of said transformer and forms an induced current flowing through said first inductance and said primary winding, when said reverse recovery current of said rectifier diode is cut off, said induced current decreases and passes through said set of inductances and said clamp circuit.

12. The converter in claim 11, said set of inductances is a tapped inductance.

13. The converter in claim 11, said first inductance is thicker than said second inductance.

14. The converter in claim 11, a ratio of turns of said second inductance and turns of said first inductance is small than or equal to a ratio of a leakage inductance of said transformer and said first inductance.

15. The converter in claim 11, said first switch, said second switch, said third switch and said fourth switch are MOSFETs.

16. The converter in claim 11, said output rectifier circuit further comprises a loss clamp circuit.

17. The converter in claim 16, said loss clamp circuit at least comprises a resistance and a capacitor.

18. The converter in claim 11, said set of inductances further comprises a third inductance, said third inductance connected between a connection point at which said first inductance and said second inductance are connected and said clamp circuit.

19. The converter in claim 18, said first inductance is thicker than said third inductance.

20. The converter in claim 18, a ratio of turns of said second inductance minus said first inductance and turns of said first inductance is small than or equal to a ratio of a leakage inductance of said transformer and said first inductance, and a ratio of turns of said third inductance minus said first inductance and turns of said first inductance is small than or equal to a ratio of a leakage inductance of said transformer and said first inductance.

* * * * *

UNITED STATES PATENT AND TRADEMARK OFFICE

CERTIFICATE OF CORRECTION

PATENT NO. : 6,944,036 B2 
DATED : September 13, 2005
INVENTOR(S) : Chao Yan et al.

It is certified that error appears in the above-identified patent and that said Letters Patent is hereby corrected as shown below:

<u>Title page,</u>
Item [75], Inventors, "Heoyi Ye" should be -- Haoyi Ye --.

Signed and Sealed this

Twentieth Day of December, 2005

JON W. DUDAS
*Director of the United States Patent and Trademark Office*